United States Patent
Cheng et al.

(10) Patent No.: US 10,648,061 B2
(45) Date of Patent: May 12, 2020

(54) PROCESSES FOR RECOVERING LITHIUM VALUES FROM LITHIUM-CONTAINING BRINES

(71) Applicant: Albemarle Corporation, Baton Rouge, LA (US)

(72) Inventors: Chi Hung Cheng, Baton Rouge, LA (US); Jackson R. Switzer, Kings Mountain, NC (US); Jan Nieman, Maarssen (NL)

(73) Assignee: ALBEMARLE CORPORATION, Charlotte, NC (US)

( * ) Notice: Subject to any disclaimer, the term of this patent is extended or adjusted under 35 U.S.C. 154(b) by 8 days.

(21) Appl. No.: 15/754,113

(22) PCT Filed: Oct. 16, 2015

(86) PCT No.: PCT/US2015/056098
§ 371 (c)(1),
(2) Date: Feb. 21, 2018

(87) PCT Pub. No.: WO2017/039724
PCT Pub. Date: Mar. 9, 2017

(65) Prior Publication Data
US 2018/0245180 A1    Aug. 30, 2018

Related U.S. Application Data

(60) Provisional application No. 62/211,429, filed on Aug. 28, 2015.

(51) Int. Cl.
C22B 26/12    (2006.01)
C01D 15/04    (2006.01)
(Continued)

(52) U.S. Cl.
CPC .............. *C22B 26/12* (2013.01); *B01J 20/041* (2013.01); *B01J 20/046* (2013.01); *B01J 20/08* (2013.01);
(Continued)

(58) Field of Classification Search
None
See application file for complete search history.

(56) References Cited

U.S. PATENT DOCUMENTS 4,348,295 A    9/1982  Burba, III
4,462,713 A *  7/1984  Zurcher .............. B01D 61/025
                                                    166/267

(Continued)

FOREIGN PATENT DOCUMENTS

CN    203 741 054 A    7/2014
CN    104 310 446 A    1/2015

(Continued)

OTHER PUBLICATIONS

Hilal et al. (Desalination, 2004, 170, 281-308). (Year: 2004).*

(Continued)

*Primary Examiner* — Clare M Perrin
(74) *Attorney, Agent, or Firm* — Marcy M. Hoefling (57) ABSTRACT

Producing high purity lithium solution from a lithium source containing dissolved $Na^+$, $Ca^{2+}$, and $Mg^{2+}$, by: passing the source into and out of a bed of sorbent composed of hydrated alumina intercalated with LiX, preferably LiCl, to extract lithium from the lithium source into the sorbent; washing the bed of sorbent with dilute aqueous LiCl to remove lithium from the sorbent to obtain a lithium eluent of increased $Li^+$ concentration; subjecting this eluent to nanofiltration to produce a lithium permeate from which Ca2+, Mg2+, and other nanofilterable components are concurrently removed, yielding a permeate solution with 25% or less, and a (Continued)

retentate solution with 75% or more $Ca^{2+}$ and $Mg^{2+}$, as compared to the eluent from washing; and subjecting the permeate solution to a particular forward osmosis yielding a solution having 13,000-25,000 ppm dissolved lithium. Specified optional steps and new features can be used to increase lithium concentrations and purity.

16 Claims, 2 Drawing Sheets

(51) Int. Cl.
 *B01J 20/04* (2006.01)
 *B01J 20/28* (2006.01)
 *B01J 20/30* (2006.01)
 *B01J 20/08* (2006.01)

(52) U.S. Cl.
 CPC ... *B01J 20/28004* (2013.01); *B01J 20/28057* (2013.01); *B01J 20/3085* (2013.01); *C01D 15/04* (2013.01); *B01J 2220/56* (2013.01)

(56) References Cited

U.S. PATENT DOCUMENTS

| | | | |
|---|---|---|---|
| 5,145,656 A * | 9/1992 | Gallup | C01D 3/16 423/42 |
| 5,389,349 A * | 2/1995 | Bauman | C01D 15/04 252/184 |
| 5,599,516 A | 2/1997 | Bauman et al. | |
| 6,113,797 A * | 9/2000 | Al-Samadi | B01D 61/022 210/650 |
| 6,280,693 B1 | 8/2001 | Bauman et al. | |
| 2011/0200508 A1 | 8/2011 | Harrison | |
| 2011/0203994 A1 | 8/2011 | McGinnis et al. | |
| 2012/0267307 A1 * | 10/2012 | McGinnis | B01D 61/002 210/638 |
| 2013/0048564 A1 | 2/2013 | Stewart | |
| 2014/0151300 A1 * | 6/2014 | Savage | C02F 9/00 210/638 |
| 2018/0244531 A1 | 8/2018 | Magnan et al. | |

FOREIGN PATENT DOCUMENTS

| | | |
|---|---|---|
| CN | 204 162 442 U | 2/2015 |
| WO | 2000/29327 A1 | 5/2000 |

OTHER PUBLICATIONS

Mroczek, et al., "From Waste to Wealth: Mineral Extraction from Geothermal Brines", Proceedings World Geothermal Congress, Melbourne, Australia, 2015, pp. 1-7.

Ryabtsev, et al., "Sorption of Lithium from Brine onto Granular $LiCl-2Al(OH)_3-mH_2O$ Sorbent under Dynamic Conditions", Russian Journal of Applied Chemistry, 2002, vol. 75, No. 7, pp. 1069-1074.

Somrani, et al., "Study on lithium separation from salt lake brines by nanofiltration (NF) and low pressure reverse osmosis (LPRO)", Desalination, 2013, 317, pp. 184-192.

* cited by examiner

Figure 2: Li Purification and Concentration

PROCESSES FOR RECOVERING LITHIUM VALUES FROM LITHIUM-CONTAINING BRINES

REFERENCE TO RELATED APPLICATIONS

This application is the National Stage of International Patent Appl. No. PCT/US2015/056098 filed on Oct. 16, 2015, which in turn claims the benefit of U.S. Provisional Patent Appl. No. 62/211,429, filed on Aug. 28, 2015, the disclosures of which is incorporated herein by reference.

TECHNICAL FIELD

This invention relates to new economical and practical process technology for recovering lithium values from lithium-containing brines to obtain water-soluble lithium salts such as LiCl of high purity and in high yields.

BACKGROUND

As is well known, in recent years a need has arisen for more economical and efficient technology enabling production of high purity lithium or its salts from suitable sources. This is reflected by an increase in research activities devoted to this subject. And it appears that this need has not been fulfilled yet by any published prior art.

GLOSSARY

As used herein, including the claims, the term "concentrated" when used in connection with a solution or in connection with a brine is meant to include a solution or brine that is saturated, most preferably with sodium chloride, although other alkali metal halide salts may also be co-present or if suitable, used alone. Although the solution or brine can contain excess water, the greater the amount of excess water, the greater the loss of effectiveness in performance. Thus, the closer to saturation the better the performance and the more preferred is the solution or brine. When a concentrated solution or brine is used, as described in the operational steps of this invention, it is desirable to achieve the most favorable results, such as loading the maximum amount of lithium from a concentrated lithium-containing brine into the sorbent, or preventing the lithium from desorbing from the sorbent with the use of a concentrated solution of sodium chloride to displace the hold up of brine before unloading lithium from the sorbent, or the use of concentrated brine that has highest osmotic pressure as the draw solution for the forward osmosis. While sodium chloride is most preferred because of its availability, low cost, and effectiveness, other suitable alkali metal salts are generally equivalent in effectiveness (although generally more costly), can be employed in the practice of this invention. Thus for convenience, reference is often made hereinafter to use of sodium chloride solutions or brines; however, solutions or brines of other suitable alkali metal salts are deemed suitable for use albeit less desirable.

One of the substances used in the practice of this invention is "hydrated alumina" which is also known in the art by a variety of terms such as alumina hydrate, alumina trihydrate, or aluminum hydroxide. It is also often identified by use of the acronym "ATH". Typically, these materials are assigned the formula $Al(OH)_3$ or $Al_2O_3 \cdot 3H_2O$. Thus, these and any other named substance of the same chemical character as any of these named materials such as Gibbsite and Bayerite are deemed suitable for use in the process of this invention. If there is any difference among such materials, one should of course use the one that gives the best performance at the lowest cost.

There are three (3) main categories of sorbents referred to herein. All three such categories may be used for recovery of lithium values from lithium-containing brine in the practice of this invention. The first category is referred to herein as a "sorbent comprised of hydrated alumina intercalated with LiX, where X is an anion of a lithium salt", which is a generic term for the other two categories. The second category is referred to as "precursor sorbent" because it has a chemical composition of the formula $(LiOH)_a(LiX)_{1-a} \cdot 2Al(OH)_3$ (where X is a halogen atom, preferably Cl, and a=0 to 1) and it can also be used instead as a precursor in forming the third category of sorbent which is a preferred sorbent for use in the Li recovery operation in the practice of this invention. This third category of sorbent has the formula $LiX \cdot 2Al(OH)_3$, (where X is a monovalent anion typically a halide ion, preferably Cl).

Nanofiltration is a pressure-driven membrane separation process that forms the transition between ultrafiltration and reverse osmosis. Nanofiltration is applicable to separate particles ranging from about $10^{-3}$ to about $10^{-2}$ microns in size; that is, particles in a size range between those separable by reverse osmosis and ultrafiltration.

The pressurized forward osmosis process referred to herein uses the difference in osmotic pressure between two solutions as a driving force to pass water through a semipermeable membrane from a solution of lower osmotic pressure to a different solution of higher osmotic pressure. In effect, the solution of lower osmotic pressure becomes more concentrated in the operation, while the solution of higher osmotic pressure is diluted. Thus, a dilute lithium-containing solution of lower osmotic pressure becomes more concentrated, while a concentrated subterranean brine is used as the solution of higher osmotic pressure. Compared to other methods of concentration (e.g. evaporation, reverse osmosis, and forward osmosis processes using added osmotic pressure increasing agents), the forward osmosis process used in this invention utilizes a large osmotic pressure differential between the two solutions used with the concentrated solution coming from an abundant source (into which waste solutions can be returned) and the less concentrated solution in which lithium concentration is being increased. Thus this kind of osmotic pressure driven forward osmosis (1) requires significantly less capital for installation and operation, and (2) requires substantially less energy for operation.

The term "inconsequential" means being of little or no importance, or insignificant, and in cases where product specifications exist for subsequent use, such specifications have been met.

NON-LIMITING SUMMARY OF THE INVENTION

This invention utilizes a particular combination of separation techniques and materials that, if utilized in a sequence described herein, has the capability of fulfilling the need for more efficient and less expensive process technology for recovering lithium from various brine sources. In accordance with this invention, such process technology has been developed. Based on results presented hereinafter, it is believed reasonable to suggest that such combination and sequence of separation techniques will produce an aqueous solution of a lithium salt such as lithium chloride of high purity and in high yield in an economical and practical manner.

This invention thus provides as an embodiment a process for producing a high purity aqueous lithium-containing solution from a source of dissolved lithium that also contains at least $Na^+$, $Ca^{2+}$, and $Mg^{2+}$ in solution, which process comprises:

(1) passing said source of dissolved lithium into and out of a bed of sorbent (preferably a bed of granular sorbent) comprised of hydrated alumina intercalated with LiX, where X is an anion of a lithium salt, preferably chloride, for a period of time for sorption of a suitable load of LiX to occur;

(2) washing the bed of sorbent in which sorption of lithium cations has occurred with a dilute solution of LiX to unload the LiX from the sorbent to obtain a lithium eluent solution of increased LiX concentration;

(3) subjecting the lithium eluent solution to nanofiltration to produce a lithium-containing permeate from which $Ca^{2+}$ and $Mg^{2+}$ components and other nanofilterable metal components are being removed concurrently and conducting the nanofiltration causing a separation in which a retentate solution is formed with a total amount of $Ca^{2+}$ and $Mg^{2+}$ of at least 75% as compared to the total amount $Ca^{2+}$ and $Mg^{2+}$ in said source of dissolved lithium and forming an aqueous lithium-containing permeate solution in which the total content of dissolved $Ca^{2+}$ and $Mg^{2+}$ has been decreased such that the total content thereof is 25% or less as compared to said lithium eluent; and (4) subjecting said last mentioned permeate solution to forward osmosis through a plurality of successive or parallel semi-permeable forward osmosis membranes in units that further reduce the water content of said permeate solution and thereby further increase the overall lithium concentration of the resultant solution so that it is in the range of about 13,000 to about 25,000 ppm of dissolved lithium.

The above process is generally used with initial lithium-containing brines containing a dissolved lithium content of at least about 100 ppm. However, there are situations in which one or more optional additional steps may be used pursuant to this invention.

These optional additional steps are set forth below as (W), (X), (Y), and (Z):

(W) passing through said bed of sorbent of (1) above, a concentrated solution of NaY, where Y is an anion of a sodium salt, preferably chloride, to displace the holdup of said source of dissolved lithium in the bed and then conducting step (2) above;

(X) subjecting said aqueous lithium-containing permeate solution formed in (3) above to pressurized reverse osmosis through a plurality of successive or parallel semi-permeable reverse osmosis membranes in units that reduce the water content of said permeate solution to produce a recyclable water stream in said units and thereby increase the overall lithium concentration of said permeate solution so that it is in the range of about 3,000 to about 9,000 ppm of dissolved lithium.

(Y) precipitating at least divalent metal components remaining in said resultant solution from step (4) above by the treatment with at least one base selected from sodium hydroxide, potassium hydroxide, sodium carbonate, and/or potassium carbonate; and precipitating solids and making a separation between the precipitated solids and the resultant purified lithium-containing solution; and (Z) contacting said resultant purified lithium-containing solution of optional step (Y) with at least one ion exchange resin to remove totally or reduce to acceptably low level(s) residual metal and/or residual metalloid content (e.g., boron) of said resultant purified lithium-containing solution.

The first optional step (W) may be conducted in order to obtain as high a lithium content and as low level of impurities as possible in the process. The second optional step (X), pressurized reverse osmosis, may be bypassed by feeding the lithium eluent solution directly to the forward osmosis step in the event that the concentration of lithium in the lithium eluent solution from said bed of sorbent is already in the range of 3,000 ppm to 5,000 ppm when the lithium containing brine has an especially high concentration of Li. The third optional step (Y) of either conducting or not conducting the step of precipitating at least said divalent components remaining in said solution by treatment with said base, depends on whether the level of divalent components remaining in said solution from step (4) warrants further reduction.

The fourth optional step (Z) may be used, and should be used, if the metal and/or metalloid content of the source of dissolved lithium used is such as to warrant further reduction. Thus, with some sources of dissolved lithium, use of this optional further step will be of assistance in achieving the objective of producing an aqueous solution of a lithium salt such as lithium chloride of high purity and in high yield in an economical and practical manner by reducing residual amounts of one or more metal and/or metalloid impurities such as boron to acceptable predetermined permissible concentration(s). However, in some instances use of this fourth optional step may be found unnecessary.

It is to be noted, that if optional step (X) is omitted, then both of optional steps (Y) and (Z) may be used in either order after conducting step (4) above, but if only one of steps (Y) and (Z) is sufficient then only one of them may be used depending on which is more suitable for use with step (4) above under the existing circumstances. However, if optional step (X) is used, then after conducting step (X), optional steps (Y) and (Z) may be used in either order after conducting step (4), but if only one of steps (Y) and (Z) is sufficient then only one of them may be used depending on which is more suitable for use with step (4). Technical and economic factors will typically govern which, if any, of the foregoing optional steps will be used in any given plant facility.

A preferred embodiment of the multi-step process of the invention (whether or not any one or more of the herein-described optional steps (W), (X), (Y), (Z) is/are used) is wherein said granular sorbent is of the formula $LiX \cdot 2Al(OH)_3$ where X is an anion of a lithium salt, preferably chloride, and having a lithium to aluminum molar ratio of up to about 0.50.

Another preferred embodiment of the multi-step process of the invention (whether or not any one or more of the herein-described optional steps (W), (X), (Y), (Z) is/are used) is wherein said sorbent used in the process is a sorbent, preferably a granular sorbent, prepared by contacting Gibbsite with an aqueous solution of lithium chloride and sodium hydroxide to form a precursor sorbent of the formula $(LiOH)_a (LiCl)_{1-a} \cdot 2Al(OH)_3$, where $a=0$ to 1, followed by the reaction with an aqueous solution of hydrochloric acid to convert LiOH in the sorbent to LiCl.

Still another preferred embodiment of the multi-step process of the invention (whether or not any one or more of the herein-described optional steps (W), (X), (Y), (Z) is/are used) is wherein said Gibbsite used in forming said sorbent in its preparation is morphologically altered by compression to have an average particle size of at least 300 microns and a surface area of at least 3 m²/g.

A further preferred embodiment of the multi-step process of the invention (whether or not any one or more of the herein-described optional steps (W), (X), (Y), (Z) is/are used) is wherein said source of dissolved lithium is from a natural or industrial brine that has a lithium concentration of at least about 100 ppm, preferably greater than about 180 ppm and is concentrated with sodium salt which enhances the recovery of lithium in the sorption operation.

Another preferred embodiment of the multi-step process of the invention (whether or not any one or more of the herein-described optional steps (W), (X), (Y), (Z) is/are used) is a process wherein in step (1) at least 50% or more, preferably about 80% or more, or still more preferably about 90% or more of lithium is extracted from the source of lithium into the sorbent.

Still another preferred embodiment of the multi-step process of the invention (whether or not any one or more of the herein-described optional steps (W), (X), (Y), (Z) is/are used) is wherein said dilute solution of lithium chloride in step (2) to unload lithium from the sorbent has a lithium chloride concentration in the range of about 300 ppm to about 3000 ppm.

Yet another preferred embodiment of the multi-step process of the invention (whether or not any one or more of the herein-described optional steps (W), (X), (Y), (Z) is/are used) is wherein the lithium eluent solution of increased $Li^+$ concentration in step (2) is in the range of about 1500 ppm to about 5000 ppm.

A further preferred embodiment of the multi-step process of the invention (whether or not any one or more of the herein-described optional steps (W), (X), (Y), (Z) is/are used) is wherein said lithium eluent solution in step (2) comprises at least $Ca^{2+}$ and/or $Mg^{2+}$ impurities in solution and in a weight ratio of dissolved $Li^+:Ca^{2+}$ and/or $Li^+:Mg^{2+}$ in the range of about 4:1 to 50:1 wt/wt.

A still further embodiment of the multi-step process of the invention (whether or not any one or more of the herein-described optional steps (W), (X), (Y), (Z) is/are used) contains any two or more of the above preferred embodiments.

An especially preferred embodiment of the multi-step process of the invention (whether or not any one or more of the herein-described optional steps (W), (X), (Y), (Z) is/are used) is wherein said granular sorbent is of the formula $LiX \cdot 2Al(OH)_3$ where X is an anion of a lithium salt, preferably chloride, and having a lithium to aluminum molar ratio of up to about 0.50; wherein said sorbent used in the process is a sorbent, preferably a granular sorbent, prepared by contacting Gibbsite with an aqueous solution of lithium chloride and sodium hydroxide to form a precursor sorbent of the formula $(LiOH)_a(LiCl)_{1-a} \cdot 2Al(OH)_3$, where a=0 to 1, followed by the reaction with an aqueous solution of hydrochloric acid to convert LiOH in the sorbent to LiCl; wherein said Gibbsite used in forming said sorbent in its preparation is morphologically altered by compression to have an average particle size of at least 300 microns and a surface area of at least 3 m²/g; wherein the source of dissolved lithium is from a natural or industrial brine that has a lithium concentration of at least about 100 ppm, preferably greater than about 180 ppm and is concentrated with sodium salt; wherein at least 50% or more, preferably about 80% or more, or still more preferably about 90% or more of lithium is extracted from the source of lithium into the sorbent; wherein said lithium eluent solution of increased $Li^+$ concentration has a $Li^+$ concentration in the range of about 1500 ppm to about 5000 ppm; and wherein said lithium eluent solution comprises at least $Ca^{2+}$ and/or $Mg^{2+}$ impurities in solution and in a weight ratio of dissolved $Li^+:Ca^{2+}$ and/or $Li^+:Mg^{2+}$ in the range of about 4:1 to 50:1 wt/wt.

It is to be clearly understood that reference above to the phrase "whether or not any one or more of the herein-described optional steps (W), (X), (Y), (Z) is/are used" is used to clearly identify which one of the steps is the step of the multi-step process presented in the specification and claims that is being referred to. This phrase is not intended and should not be construed as a limitation on the scope of the claimed invention.

Thus, the conduct of one or more additional steps beyond those described herein in performing a multi-step process of the invention falls within the scope of the claim coverage of this invention.

The above and other embodiments, objectives, features, and advantages of this invention will become still further apparent from the ensuing description, appended claims, and accompanying drawings.

BRIEF DESCRIPTION OF THE DRAWINGS

FIG. 2 when taken with FIG. 1B provides an overall schematic diagram illustrating various preferred features of the overall lithium recovery processes of this invention. FIG. 2 itself depicts schematically the purification and concentration operations of the overall processes of this invention.

Figure 1A:
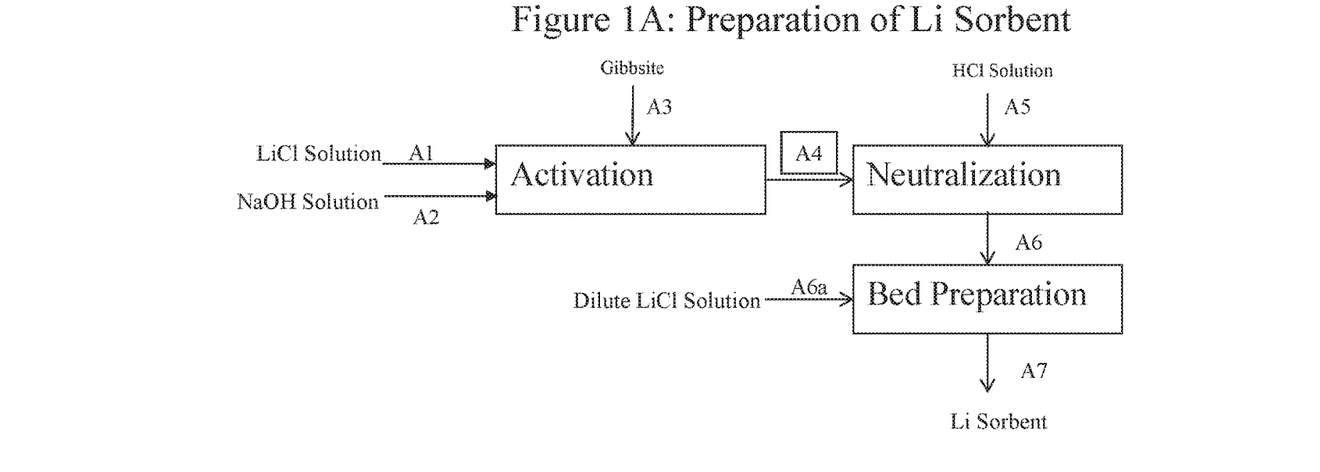
FIG. 1A is a schematic diagram illustrating preferred operations relating to the preparation of preferred sorbents and sorbent beds which in turn are used in preferred processes of this invention for recovering lithium values from lithium-containing brines.
Figure 1B:
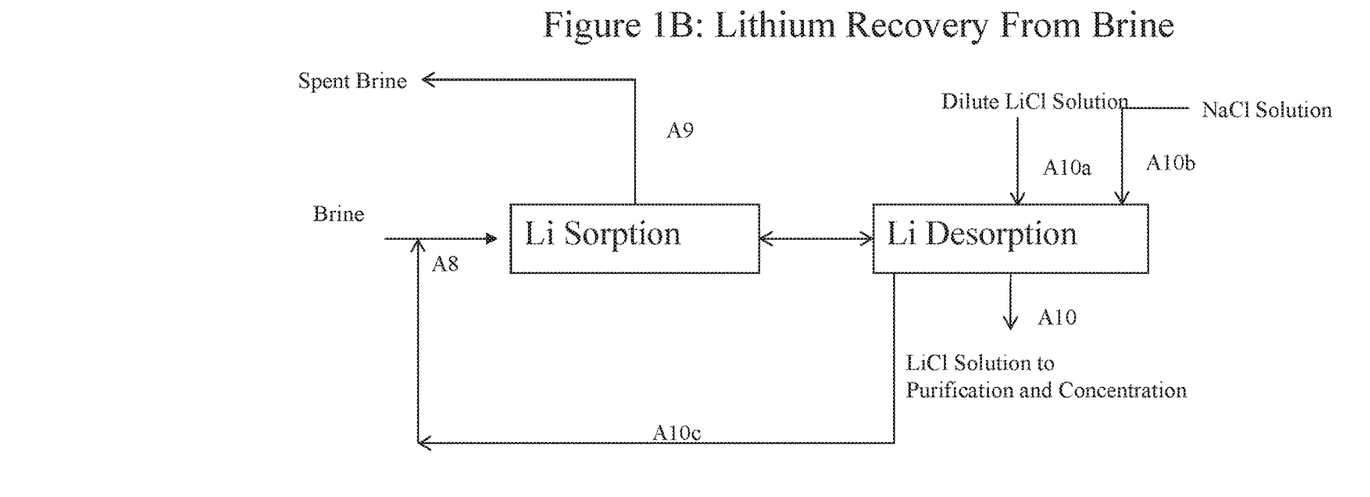
FIG. 1B is a schematic diagram illustrating schematically the sorption and desorption steps of the lithium recovery processes of the invention.
Figure 2:
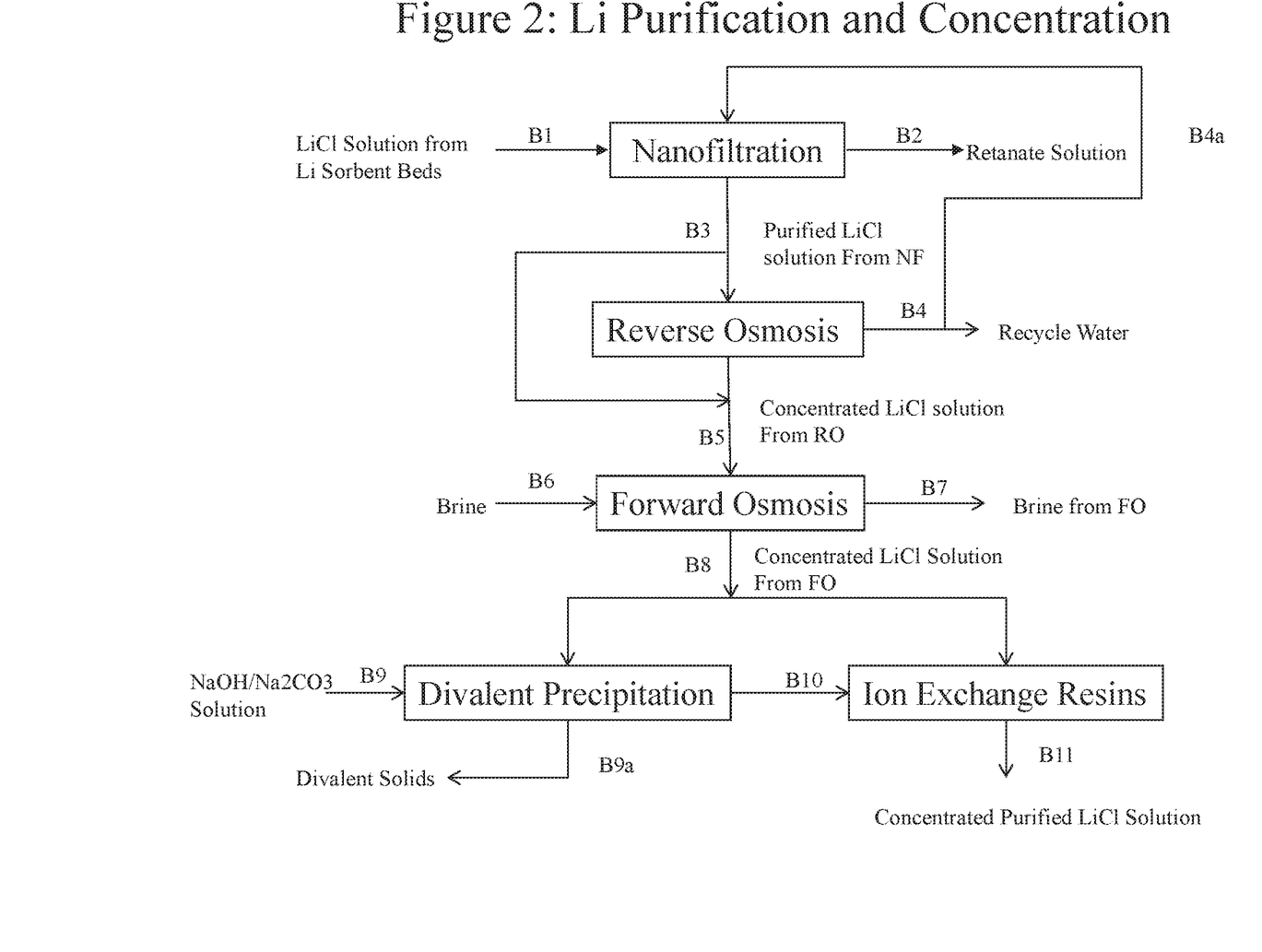

The operations of FIG. 1B and FIG. 2 are preferably conducted on a plant site which is located in close proximity to the place from which the initial lithium-containing brine is obtained e.g., from a surface or subterranean natural brine source, from an industrial plant site having a suitable by-product brine.

Also, the operations of FIG. 1 preferably are conducted on the plant site in which the recovery of lithium values from lithium-containing brine is conducted or at a site that is located close enough to the plant site to eliminate the need for transporting or shipping sorbent to the plant site.

Conducting these or all of these operations as above is advantageous. This enables these overall operations to be conducted most efficiently and economically on a continuous or semi-continuous basis.

FURTHER DETAILED DESCRIPTION OF THIS INVENTION

Brine Pretreatment

Preferably, the brine as received for processing has or is adjusted to have (i) a pH value in the range of 3-9, preferably 4-8, more preferably 5-8, (ii) no free phase of organic, and (iii) no or minimum amount of foreign solids. Preferably, the brine has a high sodium salt content. Technologies for the pretreatment of the brine are well known to those skilled in the art, such as neutralization by adding acid or base, liquid phase separation, and filtration.

Sorbents for Lithium

In the practice of processes for recovering lithium values from lithium-containing brines in accordance with this invention, a sorbent is used for treating the brine as received from its source, and if necessary or desired, after such brine has been pretreated as above. Thus, use may be made of known lithium sorbent pellets disclosed for example in U.S. Pat. Nos. 5,599,516 and 6,280,693. These patents disclose polycrystalline hydrated alumina pellets based on a hydrated alumina such as crystalline Gibbsite, bayerite, nordstrandite or bauxite. These pellets are morphologically altered by the infusion therein of LiOH (lithium hydroxide), in the absence of sodium chloride, which creates active lithium-specific sites within the crystal layers of the alumina. The infused alumina pellets, having the formula $LiOH.2Al(OH)_3$ and lithium loading up to 0.33 mol fraction, are converted to $LiCl.2Al(OH)_3$ by neutralization with HCl, and can then be used in the present process of removing lithium values from brine.

However, in especially preferred embodiments of this invention a new innovative kind of activated granular sorbent for lithium is utilized, the preparation of which is depicted schematically in FIG. 1A. In the preparation of this activated granular sorbent, preferably Gibbsite, $Al(OH)_3$, which has been morphologically altered by compression is used.

In the sorbent activation step, Gibbsite (A3) is reacted with an aqueous solution of lithium chloride (A1) and sodium hydroxide (A2) to form a precursor sorbent of the formula $(LiOH)_a(LiX)_{1-a}.2Al(OH)_3$, having a lithium to aluminum ratio of up to about 0.50, where a=0-1, preferably 0.5-0.95. The intercalation process is enhanced by heating and a preferred temperature range for the reaction is 20-100° C., preferably 50-90° C. The lithium chloride and sodium hydroxide solution should be of sufficient amount and concentration to intercalate lithium into the Gibbsite so as to provide a lithium aluminate intercalate having lithium to aluminum molar ratio from about 0.25 to 0.50 (where 0.50 is the theoretical maximum). For example, the solution may contain a lithium salt concentration of 5 to 12 weigh percent, preferably 6 to 11 weight percent. The molar ratio of lithium salt to granular $Al(OH)_3$ is about 0.3-1.0:1, preferably 0.4-0.8:1. The molar ratio of sodium hydroxide to granular Gibbsite is about 0.3-1.0:1, preferably 0.3-0.8:1. The molar ratio of sodium chloride, if present, to granular $Al(OH)_3$ is about 0.3-1.0:1.

Preferably, the Gibbsite (A3) has a surface area of at least 3 m/g with an average particle size of at least 300 microns and which has been morphologically altered by compression. A particularly preferred material of this type is commercially available under the trade designation Compalox® ON/V801 from Albemarle Corporation and produced by Martinswerk GmbH. The sorbent (A4) is then neutralized with an acid (A5), preferably hydrochloric acid. Treatment with hydrochloric acid solution converts LiOH in the sorbent into LiCl. The neutralization reaction is complete when the pH of the neutralizing solution exposed to the sorbent is reduced to about 5.0. Advantageously, the neutralization reaction may be carried out in the same vessel as the sorbent activation reaction vessel. In a preferred embodiment, both the activation reaction and the neutralization reaction are performed in the same column, with the successive solutions being passed through a bed of the particulate sorbent. The use of a column for these reactions, in comparison to an agitated vessel, reduces or eliminates the formation of undesired fines.

After the neutralization step, the lithium in the sorbent (A6), now of the formula $LiCl.2Al(OH)_3$, is partially unloaded by adding water or a dilute lithium chloride solution (A6a), preferably containing 100-300 ppm Li. The sorbent (A7) is now ready for recovering lithium from any lithium-containing brine (A8), including seawater and subterranean brines. The resultant sorbent possesses exceptionally good sorbent characteristics, compared to those described in prior arts, in particular, high lithium sorption capacity, rapid lithium sorption and desorption rates, large particle size and thereby low pressure drop in the bed, durable particle integrity, and low preparation cost.

Use of compressed Gibbsite or Bayerite allows for preparation of a sorbent which possesses exceptionally good sorbent characteristics, in particular, large particle size with high surface area, rapid intercalation rate, and durable particle integrity. In these embodiments, lithium ions intercalate into the Gibbsite at a rapid rate with high degree of Gibbsite conversion, while particle integrity is maintained and formation of fines is negligible. When the sorbent is loaded in a column, the efficiency of the sorption-desorption process is sustained at high flow rates with low pressure drop. Furthermore, in the embodiments utilizing compressed Gibbsite, the neutralization of the lithium hydroxide to lithium chloride in the intercalate can occur in a column, where the sorbent is neutralized by circulating a liquid containing acid such as hydrochloric acid at a high flow rate with low pressure drop. This substantially prevents or even eliminates formation of fines that is experienced when the neutralization is carried out in a stirred reaction vessel.

Sorption and Desorption of Lithium

These steps of the lithium recovery process of this invention are depicted schematically in FIG. 1B. The lithium sorption step which is in a highly preferred multi-step process of this invention is conducted by passing the lithium containing brine into and out of the sorbent bed—which is preferably placed in a column—at a brine temperature of 50-100° C., preferably 65-90° C., until lithium breakthrough in the effluent (A9) from the bed. The sorbent can recover lithium from brine of any concentration, although the higher the initial lithium concentration in the brine, the higher will be the sorbent take-up or load of sorbed lithium when breakthrough has occurred.

The lithium desorption step of a highly preferred multi-step process of this invention is conducted by washing the sorbent with a dilute lithium chloride solution (A10a), preferably containing 100-300 ppm Li, at a temperature of 50-100° C., preferably greater than 65° C. The desorption efficiency increases with the washing temperature. The higher the desorption efficiency, the less the amount of water required for Li desorption, and thereby the higher the lithium concentration in the eluent (A10). To increase the purity of the eluent, it is desirable to displace the holdup of brine remaining in the void space between the particles in the sorbent bed. It typically involves use of at least about 1.2 to about 1.4 volumes of water per 1 volume of void space to be purged out before collecting high purity lithium chloride solution. The purge (A10c) which contains lithium values may be recycled back to the brine for a next sorption cycle. If available, optionally a concentrated sodium chloride solution (A10b) can be used to displace the brine prior to the desorption step to minimize the lithium loss to the purge.

Purification and Concentration Steps—Background

In order to make high purity lithium salts such as lithium chloride, lithium hydroxide, and lithium carbonate, it is desirable to remove the undesired impurities, such as Mg, Ca, boron, in the lithium chloride solution to as low as possible, <1 ppm. The concentration of lithium chloride solution should also be increased to about 6% or more, preferably about 8% or more, and more preferably about 10% or more.

Typical conventional practice for the removal of divalent impurities generally requires the addition of a base, such as lime, sodium carbonate, sodium hydroxide to convert the soluble divalent chlorides to insoluble divalent salts, which are then separated from the lithium chloride solution. Although the precipitation process generally can reduce the divalent impurities in the lithium chloride solution to less than about 5 ppm, the process requires the cost for the base and produces a large amount of solid waste. The use of a basic ion exchange resin is also a way of reducing the concentration of the divalent impurities, even to less than 1 ppm, but the process is generally even more expensive, due to the costs for the resins and for its regeneration.

The use of nanofiltration for the reduction of the divalent metallic components in the lithium chloride solution is a much more preferable process, that does not require additional consumable raw materials and generates no solid waste. The use of nanofiltration for the removal of divalent metallic impurities generally works effectively for dilute lithium chloride solutions formed in the initial sorption and desorption steps of the present process. However, if used on more highly concentrated lithium solutions, the performance of nanofiltration would be considerably less efficient due to the increase of osmotic pressure because of the increase in salt concentration.

Typical conventional practice for the concentration of the lithium chloride solution calls for the use of reverse osmosis and/or evaporation. The capability of reverse osmosis is however limited to about 5% maximum lithium chloride concentration, as its osmosis pressure reaches to the maximum feasible pressure, ~1200 psi, that can be applied to a reverse osmosis membrane. Concentration can be done by solar evaporation or forced thermal evaporation. The former requires the availability of a large land sites, long evaporation time (in months), and is climate condition dependent. Concentration by forced thermal evaporation requires the capital cost for multistage evaporators with high energy consumption.

Purification and Concentration Steps of this Invention

In accordance with this invention, the disclosed process for the purification and concentration of the lithium chloride solution comprises multiple steps in the sequential use of nanofiltration, optionally reverse osmosis, forward osmosis, optionally divalent precipitation with chemical treatment with a base, and which can be followed by an optional treatment with ion-exchange resin, as depicted in FIG. 2. The objective is to obtain a high purity and high concentration lithium chloride solution that is suitable for the conversion to high purity lithium salts, while minimizing the cost for the capital equipment, raw material consumption, waste disposal, and energy costs. And as noted above, this objective is believed to have been achieved by this invention.

Nanofiltration

The majority amount of Ca and Mg present in the crude lithium chloride solution collected from the sorbent beds are first removed by the use of a nanofiltration system. Stream (B1 from FIG. 2) (also A10 from FIG. 1B) contacts one side of the nanofiltration membrane in the unit. Under modest pressure (between 100 and 500 psig), water is caused to flux from Stream (B1) through the membrane to produce a permeate stream (B3). Along with water, Stream (B3) contains monovalent ions, specifically lithium and sodium (~90%), which permeate through the membrane under the operating conditions. Divalent impurities—to include magnesium and calcium ions—however, do not readily permeate through the membrane as they remain in Stream (B2) (preferably greater than 85%), effectively providing a separation between monovalent lithium ions and divalent calcium and magnesium ions. It should be noted that flux across the membrane increases with temperature. While it is preferred to operate the process at temperatures between 50 and 90° C., the process is theoretically feasible at a wide range of temperatures. Further, the process can be operated at a wide range of pressures and flows, depending on the flux and recovery desired.

The nanofiltration system can be operated in a number of series or parallel configurations to accomplish the desired level of separation while maintaining a constant flux through the membrane. The nanofiltration system could be operated in single-pass operation, multiple-pass recirculation, and series configurations for removing divalent ions from the lithium-containing stream. For example, a portion of water (B4a) produced in a subsequent reverse osmosis unit operation is recycled back between each stage in the nanofiltration system to maintain the flux. The retentate solution (B2) exiting the nanofiltration system can be recycled back to the initial lithium-containing brines.

Concentration of the diluted lithium chloride solution exiting the nanofiltration system is accomplished by forward osmosis or sequential reverse osmosis to forward osmosis. If the LiCl concentration in the diluted purified LiCl solution (B3) contains <4-5%, it can be first subjected to pressurized reverse osmosis filter system to increase the lithium chloride concentration to 4-5%, as limited by the maximum osmotic pressure. Water permeate (B4) can be recycled for use in the lithium desorption step (A10a) in FIG. 1B and if desired, partially to the nanofiltration (B4a) to maintain the flux. The pre-concentrated LiCl solution (B5) is then subjected to a forward osmosis membrane system, where the concentration of the lithium chloride is further increased to about 10 to 12 wt %, utilizing a suitable lithium-containing brine from a natural or industrial source (B6) as the draw solution.

Reverse Osmosis

When using this step of a multi-step process of this invention, reverse osmosis process technology utilizes applied pressure to the aqueous solution concentrated, i.e., the lithium solution, to drive water from the lithium solution through a semi-permeable reverse osmosis membrane, producing a more concentrated lithium-containing solution and a separate second water stream. The pressure applied must be greater than the osmotic pressure of the lithium-containing solution for water to pass through the semi-permeable membrane.

While currently developed reverse osmosis does require application of substantial pressure to achieve concentration, it is useful in that it produces a nearly pure water stream as a result of the water that permeates through the semi-permeable reverse osmosis membrane. This water stream can then be utilized elsewhere on a plant site or recycled to the original source from which the lithium-containing solution was obtained. One advantage of using a reverse osmosis step in the multi-step processes of this invention is that it can accommodate lithium solutions of a relatively wide range of concentrations from the nanofiltration step without significant loss of lithium values in the operations. Thus the lithium solution received by and subjected to pressurized reverse osmosis through a likely plurality of semi-permeable reverse osmosis membranes in units staged in series or parallel or both, with pressure applied to the lithium solution, may initially contain in the range of about 1000 to about 5000 ppm of lithium. In such a reverse osmosis operation water is forced across the semi-permeable reverse osmosis membranes while the ions contained within the feed solution are rejected and remain on the lithium solution side of the reverse osmosis membrane. Said reverse osmosis process technology provides for the concentration of the lithium solution.

Forward Osmosis Process

This step of the multistep process of this invention increases the concentration of dissolved lithium salt(s) in a solution having a content of at least one dissolved lithium salt. This solution (hereinafter often referred to as "lithium solution") is maintained in direct contact with one side of a semi-permeable forward osmosis membrane. A concentrated brine solution (hereinafter referred to as "draw brine solution") is maintained in direct contact with the other side of the membrane, wherein the draw brine solution has a content of dissolved salt(s) and an inherent osmotic pressure that is higher than the osmotic pressure of the lithium solution during the process. The concentration of dissolved lithium salt(s) in the lithium solution is increased by the flux of water from the lithium solution through the membrane and into the draw brine solution so that the overall concentration of lithium in the lithium solution is increased.

This process is conducted without requiring use of (i) superatmospheric pressure or (ii) subatmospheric pressure or (iii) use of both of superatmospheric pressure and/or subatmospheric pressure sequentially or consecutively to assist in causing the flow of water through the membrane. Further, the process can be conducted without (i) requiring adjustment of the temperature of the lithium solution or (ii) requiring adjustment of the temperature of the draw brine solution or (iii) maintaining a temperature differential between these two solutions. A preferred feature of this invention is the ability to operate the process at ambient temperatures as well as elevated temperatures up to about 80° C.

In this invention, the initial osmotic pressure of the lithium solution is in the range of about 300 to about 1,000 psig and preferably in the range of about of about 325 to about 800 psig, whereas the inherent osmotic pressure of said draw brine solution is in the broad range of about 1,500 to about 4,000 psig or higher and preferably in the range of about 2,500 to about 3,500 psig and more preferably in the range of about 3,000 to about 3,500 psig. Such difference in osmotic pressure is sufficient to drive water from the lithium solution to draw brine solution, at an economically viable and efficient rate, concentrating said lithium solution while at the same time diluting said draw brine solution. Equilibrium is reached when the osmotic pressures of these two solutions are equivalent. Equilibrium can be avoided—to allow for a constant water flux across the membrane—by making the draw brine solution a continuous flow. Since there exist subterranean brine solutions available on a continuous basis, the continuous operation is highly desirable.

Forward Osmosis Membranes

Any of a variety of currently available commercial forward osmosis membranes may be utilized in conducting the forward osmosis step. Further as future improvements in forward osmosis membrane technology take place, membranes not now contemplated may become available for use in the practice of this invention. Currently, two preferred types of commercially available forward osmosis membranes are thin film composite membranes and cellulose acetate membranes. Thin film composite membranes are generally composed of multiple layers of materials. Typically the active layer of thin film composite forward osmosis membranes is a thin polyamide layer attached to a polysulfone or polyethersulfone porous backing layer. Said two layers sit on top of a non-woven fabric support (commonly composed of polyester) that provides rigidity to the forward osmosis membrane. Cellulose acetate forward osmosis membranes are asymmetric membranes composed solely of cellulose acetate (in diacetate and triacetate forms or blends thereof). Cellulose acetate membranes have a dense surface skin (active layer) supported on a thick non-dense layer. While the layers are made of the same polymer, they are normally dissimilar in structural composition.

Forward Osmosis Modes of Operation

In conducting the forward osmosis step, the operation can be conducted on a batch basis in a unit (also known as housing) which supports a forward osmosis membrane and also divides the unit into a first and second internal chamber. The first chamber is adapted to receive a flow of the lithium solution and contact it with one side of the forward osmosis membrane and recirculate the flow back into the first chamber. The second chamber is designed to receive a flow of the draw brine solution and contact it with the other side of said forward osmosis membrane and recirculate that flow back into the second chamber. During operation of the process, water is caused to flux through said semi-permeable forward osmosis membrane as a result of the difference in osmotic pressure between said solution in said first and second chambers, wherein the water flows from said first chamber to said second chamber. In effect, the lithium concentration of said lithium solution is increased. Because both the lithium solution and the draw brine solution are recirculated, in effect, the lithium solution is continually concentrated (with respect to lithium) while the draw brine solution is continually diluted (with respect to the increase in water content). This concentration/dilution will continue to take place until the lithium solution has an equivalent osmotic pressure to that of the draw brine solution, thus signifying equilibrium and the loss of a driving force to cause the flux of water from the lithium solution to the draw brine solution.

The concentration process using forward osmosis technology may also be conducted on a semi-continuous basis in a unit which supports a forward osmosis membrane and divides the unit into a first and second internal chamber as described above. The operation is conducted in the same manner as described above for the batch operation except that in the semi-continuous operation, the second chamber is adapted to receive a continuous or pulsed flow of non-recycled draw brine solution into, through, and out of said second chamber while causing the draw brine solution to contact the other side of said membrane. Thus, the semi-continuous process provides for a greater level of concentration at a faster rate compared to the previous embodiment conducted on a batch basis in this case through recirculation of the lithium solution and non-recycle of the draw brine solution.

The forward osmosis can also be conducted on a continuous basis in a unit (also known as housing) which supports a forward osmosis membrane and divides the unit into a first and second internal chamber. For continuous operation the first chamber receives a continuous or pulsed flow of the lithium solution that passes into, through, and out of the first chamber while causing this lithium solution to contact one side of the membrane. The second chamber receives a continuous or pulsed flow of draw brine solution into, through, and out of the second chamber while causing this draw brine solution to contact the other side of that membrane. Neither such solution is re-cycled. During operation of the process, water is caused to flux through said semi-permeable forward osmosis membrane as a result of the difference in osmotic pressure between said solutions in said first and second chambers, wherein the water flows from the first chamber to the second chamber. The result is that the lithium concentration of the lithium solution is increased. Because neither the lithium solution nor the draw brine solution is recirculated or recycled, the process is completely continuous (even when one or two pulsed flows are used) and will not reach steady-state or a point of equilibrium during a period of operation of the forward osmosis process. Said embodiment allows for the continual concentration of the lithium in the lithium solution given the continual availability of the lithium solution and draw brine solution. The draw brine solution can especially be considered continually available in cases in which the draw brine solution originates from below the Earth's surface and is available as part of other processes.

In these modes of operation (batch, semi-continuous, and continuous), the forward osmosis units may be adapted to permit flow of the lithium solution and draw brine solution in and out of the unit in countercurrent or concurrent flow directions. Countercurrent or concurrent directional flow of the lithium solution and/or draw brine solution may occur as (i) recirculated flow, (ii) continuous flow, (iii) pulsed flow, or (iv) a combination of any two of these flows. Countercurrent flow of the lithium solution and draw brine solution on opposite sides of the semi-permeable forward osmosis membrane maximizes the osmotic pressure difference observed at any given point on either side of the membrane.

Removal of Residual Impurities

The residual divalent impurities remained in the concentrated lithium chloride solution can be removed thoroughly (<1 ppm), if necessary, by chemical precipitation and/or ion-exchange resins. The concentrated lithium chloride solution can be first purified by the precipitation of the residual divalent impurities, Ca and Mg ions, by the chemical treatment with a base (B9) such as an aqueous solution of sodium carbonate and/or sodium hydroxide. The amount of base required is related to the reaction stoichiometry. The reaction can be done either in a batch agitated vessel or in a continuous stirring reaction system, at a temperature of 20-100° C., preferably at 70-100° C. due to inverse solubility of the divalent ions with temperature. The separation of the divalent solids from the LiCl solution can be accomplished by any known methods, such as the use of a filter, a centrifuge, and/or decantation. The solids (B9a) are sent to a disposal site or to an additional process for further processing. The resulting lithium chloride solution (B10) after the separation of the divalent solids typically has less than 5 ppm Ca and Mg.

The residual divalent impurities in the lithium chloride solution could be removed to less than 1 ppm by passing the solution through a bed containing an ion exchange resin. Commercially available suitable resins for the removal of divalent ions include Amberlite® IRC 747 and 748 resins, manufactured by Rohm and Hass.

If boron, a typical contaminant present in lithium containing source, is present, it can be removed by boron selective ion exchange resins. Commercially available suitable resins for the removal of boron include, for example, Amberlite® IRA 743 resin, manufactured by Rohm and Hass, and Diaion® CRB03 and CRB05 resins, manufactured by Mitsubishi Chemical Corporation.

The resultant lithium chloride solution (B11) is suitable for further processing to high purity lithium salts, such as lithium chloride, lithium hydroxide, and lithium carbonate. High purity aqueous lithium solutions and salts produced from use of the high purity lithium chloride solutions formed by this invention have various uses. For example, such high purity lithium chloride solutions and salts can be used in the production of lubricating greases and especially for batteries for power usage such as in transportation devices such as automobiles, trucks, motorcycles, aircraft, boats and submersible vehicles.

Summation and Additional Embodiments

A process for producing a high purity aqueous lithium-containing solution from a source of dissolved lithium that also contains at least $Na^+$, $Ca^{2+}$, and $Mg^{2+}$ in solution, which process comprises:
(A) passing said source of dissolved lithium into and out of a bed of sorbent comprised of hydrated alumina intercalated with LiX, where X is an anion of a lithium salt, preferably chloride, to thereby extract at least a portion of lithium from the source of dissolved lithium into the sorbent;
(B) washing the bed of sorbent in which sorption of lithium cations has occurred with a dilute solution of lithium chloride to unload the lithium cations from the sorbent to obtain a lithium eluent solution of increased $Li^+$ concentration;
(C) subjecting the lithium eluent solution to nanofiltration to produce a lithium-containing permeate from which $Ca^{2+}$ and $Mg^{2+}$ components and other nanofilterable metal components are removed concurrently and conducting the nanofiltration causing a separation in which a retentate solution is formed with a total amount of $Ca^{2+}$ and $Mg^{2+}$ of at least 75% as compared to the total amount $Ca^{2+}$ and $Mg^{2+}$ in said source of dissolved lithium and forming an aqueous lithium-containing permeate solution in which the total content of dissolved $Ca^{2+}$ and $Mg^{2+}$ has been decreased such that the total content thereof is 25% or less as compared to said lithium eluent solution; and
(D) subjecting said permeate solution to forward osmosis through a plurality of successive or parallel semi-permeable forward osmosis membranes in units that further reduce the water content of said permeate solution and thereby further increase the lithium concentration of the permeate solution so that it is in the range of about 13,000 to about 25,000 ppm of dissolved lithium.

II) A process as in I) where a residual portion of the source of dissolved lithium remains within said bed after completion of (A) and this residual portion within said bed is displaced from said bed by passing a concentrated solution of dissolved sodium halide, preferably sodium chloride, into said bed to displace said residual portion from said bed.

III) A process as in I) further comprising subjecting, after conducting the nanofiltration of (C), said aqueous lithium-containing permeate solution to pressurized reverse osmosis through a plurality of successive or parallel semi-permeable reverse osmosis membranes in units that reduce the water content of said permeate solution to produce a recyclable water stream in said units and thereby increase the lithium concentration of said permeate solution so that it is in the range of about 3,000 to about 9,000 ppm of dissolved lithium.

IV) A process as in I) further comprising precipitating, after conducting the forward osmosis of (D), residual metal content comprising at least divalent metal components and/or metalloid content remaining in said permeate solution by treatment thereof with at least one base selected from sodium hydroxide, potassium hydroxide, sodium carbonate, and/or potassium carbonate; and precipitating solids and separating the solids to obtain a purified lithium-containing solution.

V) A process as in IV) which further comprises contacting said purified lithium-containing solution with at least one ion exchange resin to thereby reduce the residual metal content and/or metalloid content of said purified lithium-containing solution, and preferably to reduce the content of one or more of said residual metals and/or metalloids to inconsequential levels, or levels that meet specifications for subsequent use.

VI) A process as in I), wherein said sorbent is of the formula LiX.2Al(OH)$_3$ where X is an anion of a lithium salt, preferably chloride, and which has a lithium to aluminum molar ratio of up to about 0.50.

VII) A process as in VI) wherein said sorbent is prepared by contacting Gibbsite with an aqueous solution of lithium chloride and sodium hydroxide to form a precursor sorbent of the formula (LiOH)$_a$(LiCl)$_{1-a}$.2Al(OH)$_3$, where a=0 to 1, followed by reaction with an aqueous solution of hydrochloric acid to convert LiOH in the precursor sorbent to LiCl.

VIII) A process as in VII) wherein said Gibbsite has been morphologically altered by compression and has an average particle size of at least 300 microns and a surface area of at least 3 m$^2$/g.

IX) A process as in I) wherein said source of dissolved lithium is from a natural or industrial brine that has a lithium concentration of at least about 100 ppm, preferably greater than 180 ppm and is concentrated with sodium salt.

X) A process as in I) wherein in (A) preferably at least 50% or more, preferably about 80% or more, or still more preferably about 90% or more of lithium is extracted from the source of dissolved lithium into the sorbent.

XI) A process as in I) wherein in (B) said dilute solution of lithium chloride to unload lithium from the sorbent has a lithium chloride concentration in the range of about 300 ppm to about 3000 ppm.

XII) A process as in I) wherein in (B) said lithium eluent solution of increased Li$^+$ concentration has a Li$^+$ concentration in the range of about 1500 ppm to about 5000 ppm.

XIII) A process as in I) wherein in (C) said lithium eluent solution comprises at least Ca$^{2+}$ and/or Mg$^{2+}$ impurities in solution and in a weight ratio of dissolved Li$^+$:Ca$^{2+}$ and/or Li$^+$:Mg$^{2+}$ in the range of about 4:1 to 50:1 wt/wt.

XIV) A process as in I) wherein said sorbent is of the formula LiX.2Al(OH)$_3$ where X is an anion of a lithium salt, preferably chloride, and which has a lithium to aluminum molar ratio of up to about 0.50; wherein said sorbent has been prepared by contacting Gibbsite with an aqueous solution of lithium chloride and sodium hydroxide to form a precursor sorbent of the formula (LiOH)$_a$(LiCl)$_{1-a}$.2Al(OH)$_3$, where a=0 to 1, followed by reaction with an aqueous solution of hydrochloric acid to convert LiOH in the precursor sorbent to LiCl; wherein said Gibbsite used in forming said sorbent in its preparation was morphologically altered by compression to have an average particle size of at least 300 microns and a surface area of at least 3 m$^2$/g; wherein the source of dissolved lithium is from a natural or industrial brine that has a lithium concentration of at least about 100 ppm, preferably greater than 180 ppm and is concentrated with sodium salt; wherein the lithium eluent solution of increased Li$^+$ concentration has a Li$^+$ concentration in the range of about 1500 ppm to about 5000 ppm; and wherein said lithium eluent solution comprises at least Ca$^{2+}$ and/or Mg$^{2+}$ impurities in solution and in a weight ratio of dissolved Li$^+$:Ca$^{2+}$ and/or Li$^+$:Mg$^{2+}$ in the range of about 4:1 to 50:1 wt/wt.

XV) A process as in any of I)-XIV) wherein said bed of sorbent in (A) is a bed of granular sorbent.

The following Examples are presented for illustrative purposes. They are not intended and should not be construed as limiting this invention to only what is disclosed therein.

EXAMPLE 1

Sorbent Activation

In this example, compressed Gibbsite is reacted with LiCl/caustic solution to produce a sorbent. The molar ratio of LiCl:NaOH:Gibbsite=0.5:0.4:1 and 8.0 wt % LiCl.

A 546 g (7.0 mol) portion of compressed Gibbsite (Compalox® ON/V-801) was reacted with 1855 g of a solution containing 8.0 wt % LiCl (3.5 mol) and 6.0 wt % NaOH (2.8 mol) in two plastic bottles placed in an oven at 70° C. After 24 hours, the combined content of the bottles was filtered. The filtrate contained 1710 ppm Li and the wet solids (818 g) contained 2.69% Li and 23.25 wt % Al (0.45 lithium to aluminum molar ratio).

EXAMPLE 2

Sorbent Neutralization

This Example illustrates neutralization of (LiOH)$_a$(LiCl)$_{1-a}$.2Al(OH)$_3$ to LiCl.2Al(OH)$_3$ with hydrochloric acid in a column.

A 2" diameter jacketed glass column was loaded with a 798 g portion (6.87 mol Al) of the wet solids from Example 1. Water was then fed to the bed upflow at 500 ml/min to remove any fine particles from the bed and until the effluent was clear. The effluent was filtered and 4.6 g and <0.6% of fine particles were recovered.

Water was then circulated upflow through the column at a constant rate of 600 ml/min, while maintaining the column at 70° C. A 20% solution of hydrochloric acid was then fed via a metering pump to the water recirculation pot to maintain a 3.5-5.0 pH value of the water being fed to the column. The neutralization was complete after about 36 hours, when the pH of the water effluent exiting the column dropped to 5.0. During the neutralization 3.6 g of fine particles were collected (about 0.4% of what was initially loaded into the column). 811.7 g of wet solids were unloaded from the column, and analysis of those solids determined that they contained 22.6% Al (6.79 mol) and 2.04% Li (2.39 mol).

EXAMPLE 3

Lithium Recovery from Brine

This Example confirms the effective performance of the preferred sorbents described herein for recovering lithium values from brine. A 665.8 g portion (5.57 mol Al) of the solids from Example 2 was loaded into a 1" diameter jacketed column for testing of the sorbent to recover LiCl value from brine.

The composition of the tested brine is given in Table 1.

To partially unload the lithium from the sorbent, to prepare the sorbent to recover LiCl from brine, 4.6 liter of water that contained 0.3% LiCl at 70° C. was upflowed through the sorbent at a constant flow rate of 60 g/min. The water was drained to the bed level by gravity. The water holdup in the bed was displaced with a void volume of brine by gravity.

For the first cycle, 8.8 liter of brine was upflowed through the column at 70° C. at a constant flow rate of 50 g/min.

Recovery of lithium value from the feed brine in this cycle was 87%. The settled bed height was 43 inch. The brine was drained to the bed level by gravity, and the brine holdup in the bed was displaced with a saturated NaCl solution.

An additional 60 g of the solids from Example 2 was loaded to the column to increase the bed height to about 4 feet. 5.3 liter of water containing 0.18% LiCl at 70° C. was upflowed at a constant flow rate of 60 g/min to unload LiCl from the sorbent. Water was drained to the bed level by gravity. The water holdup in the bed was displaced with a void volume of brine by gravity.

For the second cycle, 11.14 liters of brine was upflowed through the column at 70° C. at a constant flow rate of 50 g/min. Recovery of lithium value from the feed brine in this cycle was 91%. The settled bed height was about 4 ft.

The above cycle was repeated 16 times and no reduction in the sorbent performance was observed.

The average composition of the lithium eluent solution is given in Table 1.

TABLE 1

SORPTION/DESORPTION STEPS

| Component | Brine, (ppm) | LiCl Solution from Sorbent Bed, (ppm) |
|---|---|---|
| Li | 200 | 2270 |
| Na | 60,000 | 2130 |
| K | 3200 | 30 |
| Ca | 30,000 | 385 |
| Mg | 3000 | 275 |
| B | 190 | 40 |

EXAMPLE 4

Nanofiltration

In a laboratory scale operation, the mixed salt solution containing LiCl, NaCl, $CaCl_2$, $MgCl_2$, and $B(OH)_3$ was recirculated through a nanofiltration membrane testing apparatus under a pressure of 250 psig and a flow of 1.5 L/min. A commercially available nanofiltration membrane (GE Osmonics CK membrane) was used. Temperature was maintained at less than 30° C. The recirculating solution contacted one side of a nanofiltration membrane. As the solution recirculated permeate was collected from the alternate side of the membrane. The composition of the initial mixed salt solution and the resultant permeate solution are shown in Table 2.

TABLE 2

NANOFILTRATION STEP

| Component | Initial Mixed Salt Solution (ppm) | Resultant Permeate Solution (ppm) |
|---|---|---|
| Li | 2286 | 1850 |
| Na | 3424 | 2889 |
| Ca | 239 | 39 |
| Mg | 270 | 39 |
| B | 28 | 30 |

EXAMPLE 5

Reverse Osmosis Step

In these experiments, one to four liters of a solution containing 1.4 wt % lithium chloride, 0.80 wt % sodium chloride, 0.07 wt % calcium chloride, and 0.10 wt % magnesium chloride was used as a feed solution for the test. This solution was recirculated at a flow rate of 1-2 liters per minute through the Sterlitech® (Sterlitech Corporation, Kent, Wash.) CF042 crossflow cell adapted for reverse osmosis laboratory testing. The feed solution was passed into through and out of one chamber of the CF042 cell, allowing the solution to contact an enclosed semi-permeable reverse osmosis membrane. A variety of commercially-available semi-permeable reverse osmosis membranes commonly used for seawater desalination were evaluated. The pressure of the feed solution was maintained at 1000 psig or less and the temperature was maintained between 20° C. and 30° C.

During each experiment, the mass of the second water stream produced from the transport of water from the feed solution across the membrane was recorded, so that in effect, the rate and flux of water transport across the semi-permeable reverse osmosis membrane could be determined. In addition, samples of said feed solution and the permeate water solution were taken at varying time intervals and analyzed using inductively coupled plasma (ICP) analytical equipment.

Laboratory experiment results show that at the conditions specified, concentration of the feed solution readily took place while producing a recyclable permeabled water stream. Water flux across the membrane ranged from 20 to 30 liters per meter squared per hour depending on the semi-permeable reverse osmosis membrane used. In general, rejection of lithium chloride transport across the semi-permeable reverse osmosis membrane was at or greater than 85%, in some cases exhibiting rejections greater than 90%, meaning that only 10-15% of the lithium chloride in the feed solution permeated through the reverse osmosis membrane to the permeate water solution. A high rejection of lithium salts in the feed solution is important, in order to ensure efficient concentration of lithium in the feed solution. In these experiments, lithium chloride concentrations from 1.4 wt % to about 3 wt % were achieved. An example of the results from one of these experiments are given in Table 3.

TABLE 3

REVERSE OSMOSIS STEP

| Salts | Starting Solution (wt %) | Final Solution (wt %) |
|---|---|---|
| LiCl | 1.4 | 3.00 |
| NaCl | 0.80 | 1.71 |
| $CaCl_2$ | 0.07 | 0.15 |
| $MgCl_2$ | 0.10 | 0.25 |

EXAMPLE 6

Forward Osmosis

In general, the Feed Solution to the forward osmosis unit used in laboratory testing was a representative process stream containing between 1.0 and 3.0 wt % lithium chloride as the lithium-containing salt and about 0.80 wt % sodium chloride, 0.07 wt % calcium chloride, and 0.10 wt % magnesium chloride. The draw solution used was also a representative stream comprised of 0-0.2 wt % lithium chloride, 10-15 wt % sodium chloride, 0-3 wt % potassium chloride, 5-10 wt % calcium chloride, and 0-3 wt % magnesium chloride. The forward osmosis unit used to house the semi-permeable forward osmosis membrane was a commercially-available Sterlitech Corporation CF042 crossflow cell containing a singular flat sheet forward osmosis membrane supported between two crossflow chambers. The cell is generally considered to be a standard testing apparatus for forward osmosis process technology evaluation as well as for general flat sheet membrane testing on a laboratory scale. A variety of commercially available forward osmosis membranes were tested in the cell, comprising both thin film composite membranes and cellulose acetate membranes.

Procedure

In laboratory demonstrations, one liter of the Feed Solution was recirculated through one crossflow chamber of the CF042 cell at a flow rate of 1 liter per minute. A peristaltic pump was used to flow said Feed Solution into, through, and out of one chamber of the CF042 cell, while allowing said Feed Solution to contact one of the sides of the enclosed semi-permeable forward osmosis membrane. At the same time, a four liter quantity of a brine used as a draw solution was recirculated through the second chamber of the CF042 cell using a peristaltic pump at a flow rate of 1 liter per minute. The draw solution flowed into, through, and out of said second chamber, contacting the opposite side of said semi-permeable forward osmosis membrane. The Feed Solution and Draw Solution were both maintained at atmospheric pressure. Experiments were conducted with the Feed Solution and Draw Solution maintained at ambient temperature (near 25° C.). Additional experiments were conducted with both solutions maintained at an elevated temperature of 70° C.

During each experiment, the mass of the Feed Solution was monitored and recorded, so that the rate of water transfer and overall flux of water from said Feed Solution to the Draw Solution could be determined. In addition, samples of said Feed Solution and said Draw Solution were taken at varying time intervals and analyzed using inductively coupled plasma (ICP) analytical equipment. As noted above, the membranes were disposed so that one of the sides of the membranes was exposed separately to the Feed Solution and Draw Solution and vice versa.

Results

Laboratory experimental results show that at both 25° C. and 70° C., concentration of the Feed Solution readily occurs. Water flux across the membrane ranged from 14 liters per meter squared per hour at ambient temperature to upwards of 40 liters per meter squared per hour at the elevated temperature. In general, rejection of lithium chloride transport across the semi-permeable forward osmosis membrane was at or greater than 90 percent, meaning that only 10% or less of the lithium chloride in the Feed Solution permeated through the forward osmosis membrane to the Draw Solution. A high rejection of lithium salts in the Feed Solution is important, in order to ensure efficient concentration of lithium in said Feed Solution while preventing losses to said draw solution. Experimentally concentrations near 12 wt % lithium chloride were achieved in the Feed Solution before a near equilibrium state was reached between the Feed Solution and Draw Solution with respect to osmotic pressure. An example of the concentrated Feed Solution composition is given in Table 4 below.

TABLE 4

| FORWARD OSMOSIS STEP | |
|---|---|
| Salts | Concentrated Feed Solution (wt %) |
| LiCl | 12 |
| NaCl | 7.5 |
| KCl | 0.1 |
| CaCl$_2$ | 0.7 |
| MgCl$_2$ | 1.7 |

EXAMPLE 7

Divalent Precipitation

The treatment was conducted in a 1-liter round bottom flask equipped with an agitator, heating mantle, thermowell. A solution containing 6.1% LiCl, 0.09% CaCl$_2$ (324 ppm Ca), 0.4% MgCl$_2$ (1010 ppm Mg), and 0.75% NaCl was co-fed with a base solution containing 15.7% Na$_2$CO$_3$, 4.9% NaCl, and 4.9% NaOH, at a flow rate of 8.9 g/min and 1.43 g/min, respectively for 56 mins, while keeping the reaction temperature at 75° C. After filtration, the liquid was analyzed: 5.14% LiCl, 5 ppm Ca and <7 ppm Mg, pH=11.5.

EXAMPLE 8

Boron Ion Exchange Resins

A 1" diameter Pyrex jacketed column packed with 500 ml of Deion® CRB03, a boron selective ion exchange resin, was used for the treatment for the removal of boron from the lithium chloride solution after the divalent precipitation. A total of 10 liter solution containing 8.2% LiCl and 184 ppm B was fed to the column at a flow rate of 8.4 g/min, while keeping the resin column at 70° C. The composite effluent was analyzed: <1 ppm B.

Except as may be expressly otherwise indicated, the article "a" or "an" if and as used herein is not intended to limit, and should not be construed as limiting, a claim to a single element to which the article refers. Rather, the article "a" or "an" if and as used herein is intended to cover one or more such elements, unless the text taken in context clearly indicates otherwise.

This invention is susceptible to considerable variation in its practice. Therefore the foregoing description is not intended to limit, and should not be construed as limiting, the invention to the particular exemplifications presented hereinabove.

The invention claimed is:

1. A process for producing an aqueous lithium-containing solution from a source of dissolved lithium that also contains at least Na$^+$, Ca$^{2+}$, and Mg$^{2+}$ in solution, which process comprises:
   (A) passing said source of dissolved lithium into and out of a bed of sorbent comprised of hydrated alumina intercalated with LiX, where X is an anion of a lithium salt, to thereby extract at least a portion of lithium from the source of dissolved lithium into the sorbent;
   (B) washing the bed of sorbent with a dilute solution of lithium chloride to obtain a lithium eluent solution;
   (C) subjecting the lithium eluent solution to nanofiltration to produce a lithium-containing permeate solution and a retentate solution comprising a total amount of Ca$^{2+}$ and Mg$^{2+}$ of at least 75% as compared to the total amount Ca$^{2+}$ and Mg$^{2+}$ in said source of dissolved lithium and wherein the permeate solution comprises a total content of dissolved $Ca^{2+}$ and $Mg^{2+}$ that is 25% or less as compared to said lithium eluent solution; and (D) subjecting said permeate solution to forward osmosis through a plurality of successive or parallel semipermeable forward osmosis membranes in units that further reduce the water content of said permeate solution and thereby further increase the lithium concentration of the permeate solution so that it is in the range of about 13,000 to about 25,000 ppm of dissolved lithium.

2. A process as in claim 1 where a residual portion of the source of dissolved lithium remains within said bed after completion of step (A) and this residual portion within said bed is displaced from said bed by passing a concentrated solution of dissolved sodium halide into said bed.

3. A process as in claim 1 further comprising subjecting, after conducting the nanofiltration of step (C), said permeate solution to pressurized reverse osmosis through a plurality of successive or parallel semi-permeable reverse osmosis membranes.

4. A process as in claim 1 further comprising, after conducting the forward osmosis of step (D), precipitating solids from residual metal content comprising at least divalent metal components and/or metalloid content remaining in said permeate solution by treatment thereof with at least one base selected from sodium hydroxide, potassium hydroxide, sodium carbonate, and/or potassium carbonate; and separating the solids to obtain a purified lithium-containing solution.

5. A process as in claim 4 which further comprises contacting said purified lithium-containing solution with at least one ion exchange resin to thereby reduce the residual metal content and/or metalloid content of said purified lithium-containing solution.

6. A process as in claim 1, wherein said sorbent is of the formula $LiX.2Al(OH)_3$ where X is an anion of a lithium salt, and which has a lithium to aluminum molar ratio of up to about 0.50.

7. A process as in claim 6 wherein said sorbent is prepared by contacting gibbsite with an aqueous solution of lithium chloride and sodium hydroxide to form a precursor sorbent of the formula $(LiOH)_a(LiCl)_{1-a}.2Al(OH)_3$, where a=0 to 1, followed by reaction with an aqueous solution of hydrochloric acid to convert LiOH in the precursor sorbent to LiCl.

8. A process as in claim 7 wherein said gibbsite has been morphologically altered by compression and has an average particle size of at least 300 microns and a surface area of at least 3 $m^2/g$.

9. A process as in claim 1 wherein said source of dissolved lithium is from a natural or industrial brine that has a lithium concentration of at least about 100 ppm.

10. A process as in claim 1 wherein in (A) at least 50% or more of lithium is extracted from the source of dissolved lithium into the sorbent.

11. A process as in claim 1 wherein in (B) said dilute solution of lithium chloride to unload lithium from the sorbent has a lithium chloride concentration in the range of about 300 ppm to about 3000 ppm.

12. A process as in claim 1 wherein in step (B) said lithium eluent solution has a $Li^+$ concentration in the range of about 1500 ppm to about 5000 ppm.

13. A process as in claim 1 wherein in (C) said lithium eluent solution comprises at least $Ca^{2+}$ and/or $Mg^{2+}$ impurities in solution and in a weight ratio of dissolved $Li^+:Ca^{2+}$ and/or $Li^+:Mg^{2+}$ in the range of about 4:1 to 50:1 wt/wt.

14. A process as in claim 1 wherein
said sorbent is of the formula $LiX.2Al(OH)_3$ where X is an anion of a lithium salt, and which has a lithium to aluminum molar ratio of up to about 0.50;
said sorbent has been prepared by contacting gibbsite with an aqueous solution of lithium chloride and sodium hydroxide to form a precursor sorbent of the formula $(LiOH)_a(LiCl)_{1-a}.2Al(OH)_3$, where a=0 to 1, followed by reaction with an aqueous solution of hydrochloric acid to convert LiOH in the precursor sorbent to LiCl;
said gibbsite used in forming said sorbent in its preparation was morphologically altered by compression to have an average particle size of at least 300 microns and a surface area of at least 3 $m^2/g$;
the source of dissolved lithium is from a natural or industrial brine that has a lithium concentration of at least about 100 ppm;
the lithium eluent solution of increased $Li^+$ concentration has a $Li^+$ concentration in the range of about 1500 ppm to about 5000 ppm; and
said lithium eluent solution comprises at least $Ca^{2+}$ and/or $Mg^{2+}$ impurities in solution and in a weight ratio of dissolved $Li^+:Ca^{2+}$ and/or $Li^+:Mg^{2+}$ in the range of about 4:1 to 50:1 wt/wt.

15. A process as in claim 1 wherein said bed of sorbent in step (A) is a bed of granular sorbent.

16. A process as in claim 1 where X is chloride, wherein said source of dissolved lithium is from a natural or industrial brine that has a lithium concentration of greater than 180 ppm, and/or wherein in (A) about 80% or more of lithium is extracted from the source of dissolved lithium into the sorbent.

* * * * *